June 29, 1926.
M. D. VOLLMER
EGG PROTECTOR
Filed August 10, 1925
1,590,485
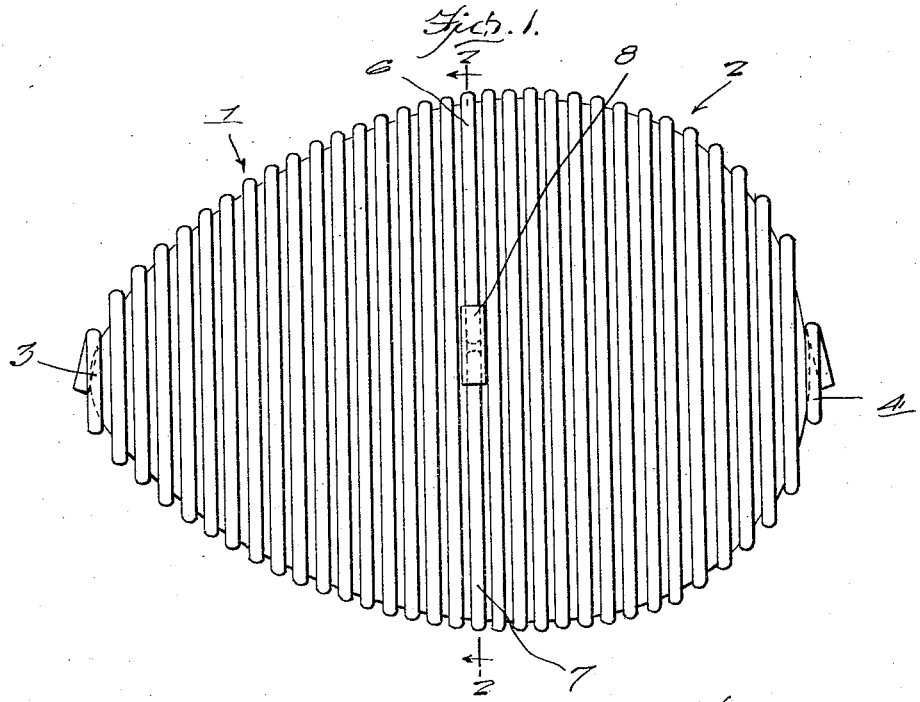
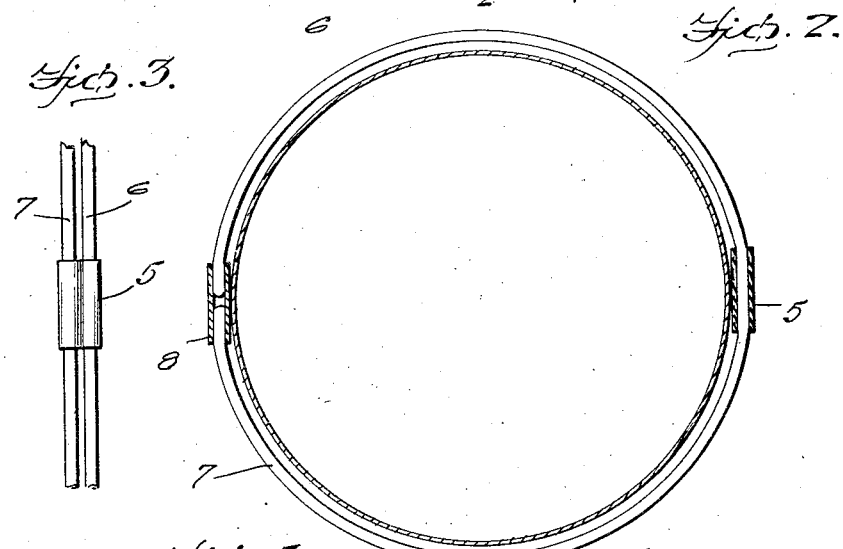
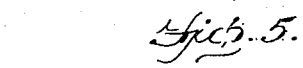
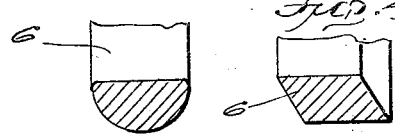
Inventor
M. D. Vollmer
By Clarence A. O'Brien
Attorney Patented June 29, 1926.

1,590,485

UNITED STATES PATENT OFFICE.

MILTON D. VOLLMER, OF WILLOW CITY, NORTH DAKOTA.

EGG PROTECTOR.

Application filed August 10, 1925. Serial No. 49,414.

This invention relates to a highly novel and simple device for protecting eggs, and more particularly for use in connection with hatching eggs.

One of the important objects of the present invention is to provide an egg protector which will entirely enclose the egg so as to prevent the same from being eaten or broken by any egg eating fowl.

A further object is to provide an egg protector which is of such construction as to accommodate eggs of various shapes, the protector being constructed of a yieldable material so that the same may readily and automatically conform to the shape of the egg to be encased.

A further object is to provide an egg protector of the above mentioned character which includes a pair of complementary cup-shaped sections, means being provided for hingedly connecting the inner opposed ends of the sections together at one side to facilitate the opening or the closing of the sections, means being associated with the opposite sides of the sections at the inner ends thereof for holding the sections in a closed position.

A still further object is to provide an egg protector of the above mentioned character which is simple in construction, inexpensive, strong and durable and further well adapted to the purpose for which it is designed.

Other objects and advantages of the invention will become apparent during the course of the following description taken in connection with the accompanying drawing.

In the accompanying drawing forming a part of this application, and in which like numerals designate like parts throughout the same:

Figure 1 is a side elevation of the egg protector embodying my invention showing the manner in which the same encases an egg.

Figure 2 is a sectional view taken approximately on line 2—2 of Figure 1.

Figure 3 is a detail side elevation showing the hinge.

Figure 4 is a cross sectional view of the wire from which each of the cup-shaped sections are formed, and Figure 5 is a similar view of a modification.

In the drawing, wherein for the purpose of illustration is shown the preferred embodiment of my invention, my improved egg protector includes the complementary cup-shaped sections 1 and 2 respectively. Each of the sections is in the form of volute coil spring, and the wire from which the same is formed is preferably rectangular in cross section, as is clearly illustrated in Figure 4, although it is to be understood that I do not wish to limit myself to the particular shape of the cross section of the wire, the same may be circular, oval, or a parallelogram or semi-circular. The last mentioned design is shown as a modification in Figure 5.

The convolutions of each section are closely arranged, and the purpose thereof will hereinafter be more fully described. As is clearly illustrated in Figure 1, the section 1 tapers more toward its outer end than the section 2, the section 1 being adapted to encase the so-called pointed or longer end of the egg while the other section 2 encases the larger rounded portion. The apex 3 of the volute coil spring cup-shaped section 1 extends over the pointed end of the egg while the apex 4 of the section 2 engages the opposite end of the egg.

By constructing the egg protector of spring wire in the form of volute coils, the sections will be adapted to readily and easily conform to the shape and size of an egg which is to be protected, it being understood of course that the inner diameter of the egg protector is slightly less than the diameter of an average egg, so that the sections comprising the protector will slightly expand when the device is to be used.

The inner open end of the cup shaped sections 1 and 2 are hingedly connected together at one side through the medium of a metallic sleeve 5 which engages the adjacent strands 6 and 7 of the sections 1 and 2 respectively. The sleeve is in the form of a clip so as to be readily sprung over these aforementioned strands of wire, yet permit the strands to move or slightly rotate within the portions of the sleeve.

The hinge 5 permits the cup shaped sections to be swung to an open or closed position, and for the purpose of securing the sections together in a closed position, the inner free ends of the strands forming the volute coil spring cup shaped sections 1 and 2 are to be disposed in vertical alignment, and in abutting relation as shown in the drawing. A sleeve 8 is slidably positioned over the opposed free ends of the strands 6 and 7, and it is obvious that when the sleeve is moved either upwardly or downwardly, the free ends of the strands 6 and 7 will be separated, and thereby permit the sections to be readily swung to an open position so that an egg may be placed within the protector after which the sections are again brought to a closed position, and are held in such a manner through the locking sleeve 8.

The provision of an egg protector of the above mentioned character is particularly adapted for use in connection with eggs used for hatching purposes, and will prevent such eggs from being broken or eaten by egg eating fowls. By constructing an egg protector of spring wire in the manner as above described, the egg will be entirely protected when encased, and furthermore the device may be readily and easily opened or closed. Also, eggs varying in size and shape may be accommodated due to the construction of my improved egg protector.

While I have shown the preferred embodiment of my invention it is to be understood that minor changes in the size, shape, and arrangement of parts may be resorted to without departing from the spirit of the invention and the scope of the appended claims.

Having thus described the invention, what I claim as new is:—

1. An egg protector comprising a pair of complementary cup-shaped sections, each section comprising a volute coil spring, and means for connecting the inner open ends of the sections together.

2. An egg protector comprising a pair of complementary cup-shaped egg enclosing sections, each section comprising a volute coil spring, a hinge for connecting the inner open ends of the sections at one side of the protector, and a closure associated with the inner open ends of the sections on the opposite side.

3. An egg protector comprising a pair of complementary cup-shaped egg enclosing sections, each of said sections comprising a volute coil spring, means for hingedly connecting the inner opposed open ends of the sections at one side of the protector, and means for securing the opposite side of the protector.

4. An egg protector comprising a pair of complementary cup-shaped egg enclosing sections, each section comprising a volute coil spring, the strands of wire comprising the volute coil spring sections being closely related, means for hingedly connecting the adjacent strands of the volute coil spring sections at the inner opposed ends of said sections on one side of the protector, the free end of the innermost strands of said sections being arranged in vertical alignment and in abutting relation, and means cooperating with the abutting free ends of the strands forming a closure for the opposite side of the sections.

5. An egg protector comprising a pair of complementary cup-shaped egg enclosing sections, each section comprising a volute coil spring, the strands of wire comprising the volute coil spring sections being closely related, means for hingedly connecting the adjacent strands of the volute coil spring sections at the inner opposed ends of said sections on one side of the protector, the free end of the innermost strands of said sections being arranged in vertical alignment and in abutting relation, and means cooperating with the abutting free ends of the strands forming a closure for the opposite side of the sections, said last mentioned means comprising a sleeve slidable over the free ends of the strands.

In testimony whereof I affix my signature.

MILTON D. VOLLMER.